Nov. 3, 1931.    L. H. JUNKEN ET AL    1,830,703
CONTROL AND PROTECTIVE SYSTEM
Filed May 23, 1927
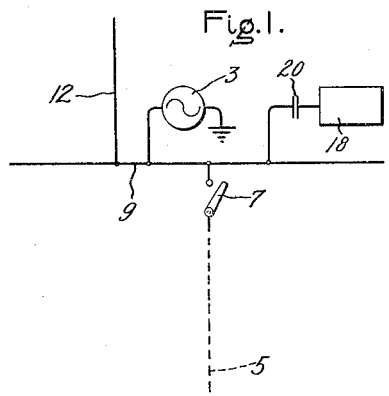
Fig.1.
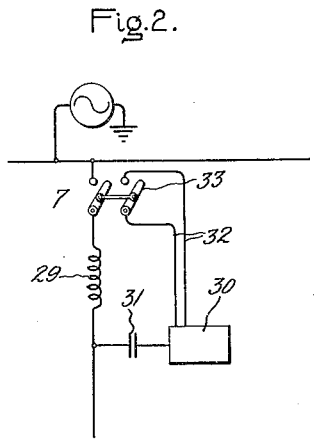
Fig.2.
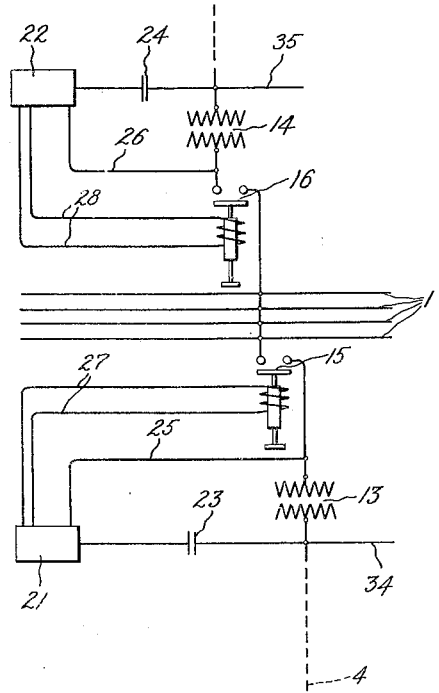
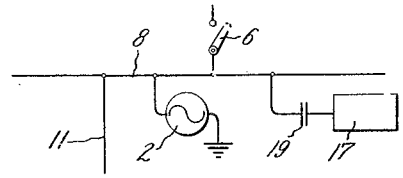
Inventors:
Lawrence H. Junken,
David K. Blake,
by
Their Attorney.

Patented Nov. 3, 1931

1,830,703

UNITED STATES PATENT OFFICE

LAWRENCE H. JUNKEN, OF SCHENECTADY, AND DAVID K. BLAKE, OF SCOTIA, NEW YORK, ASSIGNORS TO GENERAL ELECTRIC COMPANY, A CORPORATION OF NEW YORK

CONTROL AND PROTECTIVE SYSTEM

Application filed May 23, 1927. Serial No. 193,541.

Our invention relates to protective systems for power distribution systems and more particularly to means for operating connecting devices such as are used in the interconnecting circuits thereof. It has for its purpose to provide novel means for disconnecting interconnecting feeder circuits from the distribution network when through some means, automatic or otherwise, the interconnecting feeder has been disconnected from the energy supply circuit or generating station bus or has been accidentally broken or short-circuited. Heretofore the above purpose has been accomplished by means of systems of relays, etc. which have been made to operate responsively to change of direction, magnitude or phase relation of the currents or voltages of the conductors. These systems have usually been complicated and expensive in their circuit arrangement and construction. It is the purpose of our invention to eliminate systems of this kind and to provide novel means whereby this result may be accomplished in a more economical and satisfactory manner than has heretofore been possible.

The novel features of our invention will be set forth in the appended claims. Our invention itself, however, both as to its organization and method of operation together with further objects and advantages thereof will best be understood by reference to the following description taken in connection with the accompanying drawings in which Fig. 1 shows a one-line diagram of a part of a power distribution system to which our invention has been applied, and Fig. 2 illustrates a modification thereof.

With reference to Fig. 1, 1 represents a power distribution network, or work circuit, which is adapted to be supplied with energy from a plurality of generating stations 2, 3 through energy supply circuits 8, 9 and interconnecting circuits 4, 5. 6, 7 represent connecting means or switches which may be operated either manually or automatically as desired, and which are employed to connect the interconnecting circuits 4, 5 to the energy supply circuits 8, 9. The circuits 8, 9 represent the usual generating station busses which lead to the various interconnecting feeder circuits of the system which are represented by conductors 4, 5, 11, 12. The feeder circuits 4, 5 may be assumed to lead to different parts of the particular distribution network 1. In each of the interconnecting circuits 4, 5 are connected the usual energy translating devices 13, 14, such as transformers, etc. for translating the generated energy into the form consumed in the network circuit 1. There may be a plurality of such translating devices associated with any circuit 4, 5 as is indicated by conductors 34, 35. 15 and 16 represent connecting means for connecting the output circuits of these devices to the distribution network 1.

As has been stated we propose to operate the connecting means 15, 16 responsively to operation of the connecting means 6, 7 or to accidental interruption of the circuit as by breaking or short-circuiting of the conductors. For this purpose each of the energy supply circuits or generating busses 8, 9 is supplied with control currents which may be of high frequency, as desired, and which are furnished by means of generators 17, 18 through the usual coupling means 19, 20. Associated with the interconnecting circuits 4, 5 are high frequency or control current responsive means 21, 22 which are connected through coupling condensers 23, 24 to the energy supply side of the translating devices 13, 14. These responsive means may be of any usual constructions such as those commonly employed in connection with high frequency signaling systems. One means which may be employed is shown in Patent No. 1,626,480, April 26, 1927 to L. J. Perkins, although it will be understood that any means which will maintain a relay circuit either energized, or deenergized, when control current is received and in the opposite condition of energization when the supply of control current thereto is interrupted, may be used. The energy necessary to the operation of these devices may preferably be derived through circuits 25 and 26 from the output circuits of the translating devices 13 and 14. These circuits are usually of low potential such that the energy derived therefrom may be utilized directly in the energizing circuits of the devices 21 and 22 without the use of additional translating devices in these circuits. The output circuits 27, 28 of the control current responsive devices 21, 22 are connected to the actuating windings of the connecting devices 15, 16.

In the operation of our system when the switches 6, 7 are in their closed position control currents will be supplied from the generators 17, 18 through the coupling means 19, 20, energy supply circuits 8, 9, connecting means 6, 7, interconnecting circuits 4, 5 and coupling means 23, 24 to the responsive means 21, 22. These responsive means, as indicated by the position of the connecting devices 15 and 16 in the drawings are of such a nature that when control currents are received their output circuits will be energized and the connecting devices 15, 16 will be retained in their closed position. If for some reason the connecting means 7 is operated to its open position, or if the interconnecting circuit 5 has otherwise been interrupted as by accidental breaking or short-circuiting of the conductors, the flow of control currents through this circuit to the responsive means 22 will accordingly be interrupted and the output circuit 28 and actuating coil of the connecting means 16 will be deenergized and the switch will be moved to its open position thereby disconnecting the translating device 14 and the interconnecting circuit 5 both from the energy supply circuits 9 and from the distribution network 1. When the connecting means 7 is again moved to its closed position control currents are again supplied to the responsive means 22 and the connecting means 16 will again be closed.

The translating devices 13, 14 of the usual distribution system will ordinarily offer sufficiently high impedance to high frequency currents to prevent appreciable quantities of high frequency energy from being transmitted to the distribution network 1. As a consequence when, as for example, the connecting means 7 has been operated to its open position connecting switch 16 cannot be retained in its closed position by high frequency currents transmitted over the interconnecting circuit 4 through the translating device 13, distribution network 1 and translating device 14. This feature of the operation of our device is augmented by the fact that the translating devices 13, 14 are connected in series with respect to these currents. If in a particular case where insufficient impedance is offered by these translating devices, as for example, when the control currents are of comparatively low frequency, additional impendance to the control currents may be artificially inserted into the power circuits. As a consequence it will be seen that each of the responsive means 21, 22 operates as a unit separate from other like means which are associated with the various interconnecting circuits of the system and each independently controls its own connecting means 15, 16 responsively to interruptions of the control currents produced by operation of the switches 6, 7 associated with its own feeder circuit.

In Fig. 2 we have shown a modification of our system which may be employed in connection with a particular feeder of the system, which is provided with a voltage regulator or other power apparatus illustrated by 29 which offers a high impedance to the flow of high frequency currents. Control currents may, of course, be by-passed around these impedances by means of condensers and the like. It may be preferable, however, in a particular case to provide interconnecting circuits with individual control current generators 30 for supplying control currents to the particular feeder. This may be done through coupling means 31. The actuating circuits of the generators 30 may be interlocked as by means of conductors 32 and connecting means 33 with the connecting means 7 of the interconnecting circuit. With this arrangement when the connecting means 7 is moved to its open position the actuating circuit will be interrupted by the switch 33 thereby rendering the generator 30 ineffective and interrupting the flow of control currents to this feeder. This will in turn cause the control current responsive means associated with this feeder to actuate its connecting means to the open position thereby disconnecting the interconnecting circuit from the power distribution system.

While we have particularly mentioned the use of control currents of high frequency it will of course be understood that current of any frequency or characteristic by means of which it may be separated readily from the power currents may be employed. For example in three phase Y connected systems direct current might be employed, this being inserted at the neutral of the Y at the generating stations, transmitted through the system and through the connecting means 6, 7 to the neutral of the Y at the translating devices 13, 14 and there supplied to direct current responsive means 21, 22. It will of course be understood that any such means is within the contemplations of the present invention.

While we have shown and described a particular embodiment of our invention it will of course be understood that we do not wish to be limited thereto since many modifications may be made both in the circuit arrangement and in the instrumentalities employed without departing from the scope of our invention as set forth in the appended claims.

What we claim as new and desire to secure by Letters Patent of the United States is:

1. In combination, a power distribution system, a source of power current, an interconnecting circuit, means for connecting said interconnecting circuit to said power current source, means for connecting said interconnecting circuit to said distribution system, means for super-imposing control currents on the power current of said interconnecting circuit dependent on the position of said first mentioned connecting means and means responsive to said control currents for maintaining said second mentioned connecting means in a position corresponding to the position of said first mentioned connecting means.

2. In combination, an electrical translating device, a power supply circuit, a work circuit, means for connecting said translating device to said power supply circuit, means for connecting said translating device to said work circuit, control current responsive means adapted to control the operation of said second mentioned connecting means and means for supplying control currents to said responsive means dependent on the position of said first mentioned connecting means, said control current responsive means being unresponsive to power currents supplied to said translating device and arranged to maintain said second mentioned connecting means in a position corresponding to the first mentioned connecting means.

3. In a power distribution system including a distribution network, energy supply circuits, interconnecting circuits, means for connecting said interconnecting circuits to said energy supply circuits and means for connecting said interconnecting circuits to said distribution network, means for supplying control currents to said energy supply circuits, control current responsive means associated with said interconnecting circuits for controlling the operation of said second mentioned connecting means responsively to operation of said first mentioned connecting means and means for preventing control currents from flowing from one interconnecting circuit to another.

4. In a power distribution system including a distribution network, an energy supply circuit, an interconnecting circuit including an energy translating device, means for connecting said interconnecting circuit to said energy supply circuit, and means for connecting said interconnecting circuit to said distribution network whereby energy is supplied from said energy supply circuit to said distribution network, means for supplying control current to said interconnecting circuit through said first mentioned connecting means, control current responsive means associated with said interconnecting circuit on the energy supply side of said translating device and adapted to control the position of said second mentioned connecting means responsively to operation of said first mentioned connecting means and in accordance with the position thereof.

5. In combination, a source of power currents, a work circuit, an interconnecting circuit leading from said source of power currents and including connecting means located near the ends thereof, protective means for said interconnecting circuit including means independent of said power currents for supplying control currents of different character from said power currents to said interconnecting circuit near one end thereof dependently upon the position of the connecting means at said end and means located near the opposite end of said interconnecting circuit for retaining said opposite connecting means in its closed position when said control currents are received and for opening said opposite connecting means in response to interruption of said control currents.

In witness whereof, we have hereunto set our hands this 20th day of May, 1927.

LAWRENCE H. JUNKEN.
DAVID K. BLAKE.